April 16, 1935.　　　　　J. S. PARSONS　　　　　1,997,597
SYSTEM OF A. C. DISTRIBUTION
Filed Jan. 18, 1929　　　3 Sheets-Sheet 1

INVENTOR
John S. Parsons.
BY
ATTORNEY

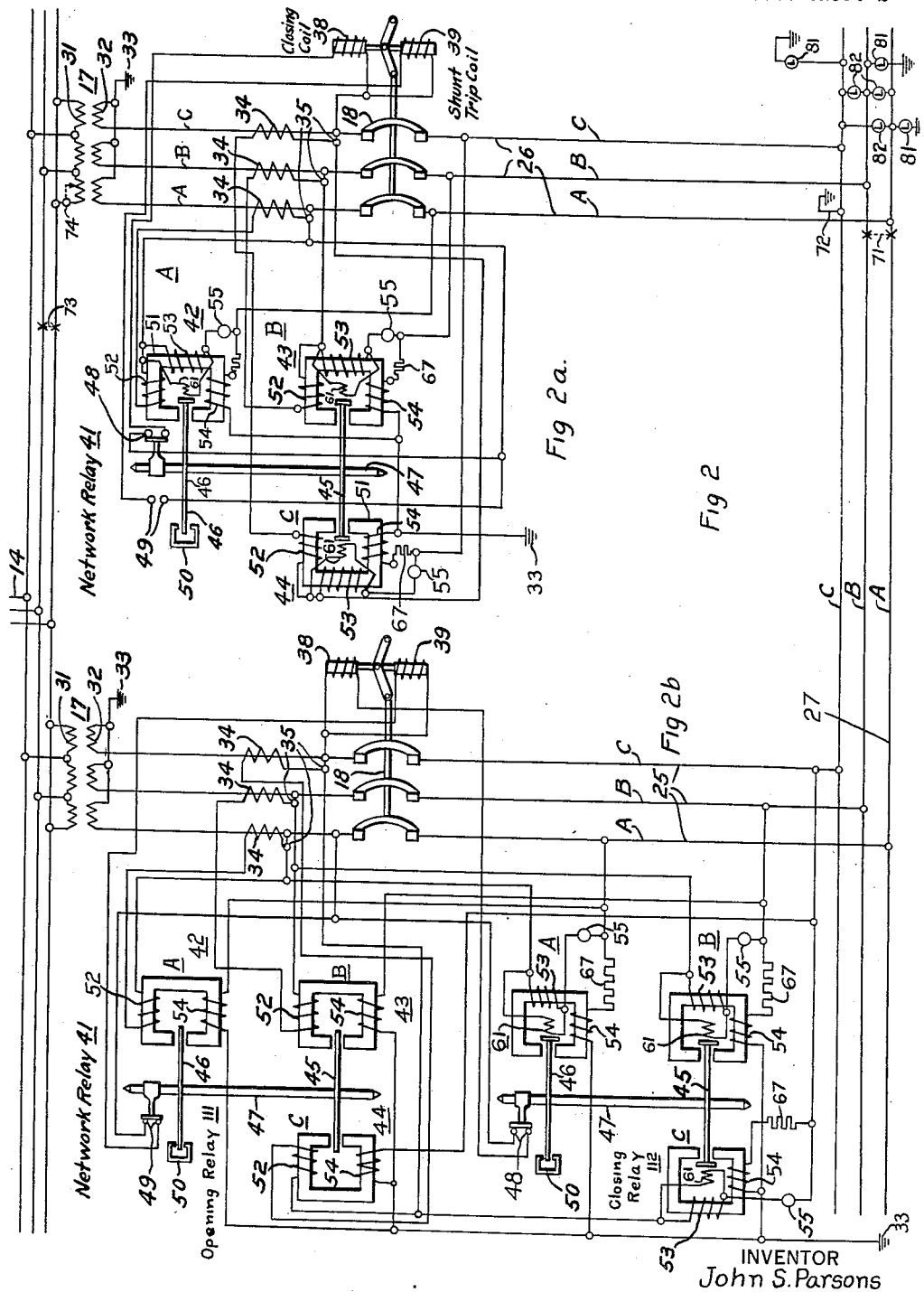

Patented Apr. 16, 1935

1,997,597

UNITED STATES PATENT OFFICE 1,997,597

SYSTEM OF A. C. DISTRIBUTION

John S. Parsons, East Orange, N. J., assignor to Westinghouse Electric & Manufacturing Company, East Pittsburgh, Pa., a corporation of Pennsylvania Application January 18, 1929, Serial No. 333,491

19 Claims. (Cl. 175—294)

This invention relates to systems of alternating-current distribution comprising a low-voltage secondary-network or load circuit supplied with power through a plurality of feeders, and, more particularly, to a circuit interrupter and control means therefor for controlling the connection of said feeders to said network circuit.

The principal objects of this invention are as follows:

To protect high-tension feeders and transformers in a low-voltage system of distribution and to provide means whereby the feeders to such low-voltage network may be connected to, or disconnected from, said network at will by closing or opening the high-tension circuit interrupters connected to the high-tension side of the distribution transformers;

To provide means for controlling a network switch by utilization of a single relay having anti-pumping characteristics;

To provide a control arrangement for a network switch or circuit interrupter which shall be "pump-proof" for loads within the normal lagging range encountered in network distribution systems;

To provide means for synchronizing the main sources of power through the network; and To provide means for automatically opening a circuit-interrupter when a leading or lagging reverse-current flows therethrough.

The operation of distribution transformers in parallel on both the primary and secondary sides has many advantages but also introduces certain complications in case of a fault condition. The successful operation of such an alternating-current-network system has required the development of automatic switches or circuit-interrupters for both the protection and switching of the transformers.

The performance required of such switches is that they shall operate automatically to isolate the distribution transformers, to which they are connected, from the network load centers, in the case of a reversal of power even as small as the reverse magnetizing energy of the distribution transformers; that they shall not open under conditions of normal direct power flow; and that, having opened, they shall also automatically reclose when the voltage and phase conditions are such that the resultant power flow is into the network.

The network-control apparatus is automatic in both the opening and the closing operations of the network switch or breaker, and the network relay apparatus is called upon to supply the control impulses for both operations.

The currents and voltages which are used to actuate the relay apparatus are related to each other in a somewhat complicated manner, and the interrelations of these quantities are dependent upon the physical characteristics of the particular network system. These relations will be described more in detail later.

The network-control apparatus must be adjusted in accordance with the physical characteristics of the distribution system and although the operating requirements of the network control apparatus, including the relay apparatus, are rather complicated, the construction and operating adjustments, as disclosed in this invention are relatively simple.

The condition which ordinarily requires opening of the breaker is that the flow of energy is in a direction from the network toward the transformer, namely, the reverse-power direction, and the condition under which the network breaker may be closed is that the relationship between the voltage of the network and that of the transformer banks, which are to be connected, shall be such as to cause a flow of energy from the transformer toward the network after the network breaker has been closed.

An improved control means, including a relay apparatus for controlling the connections of the transformers to the network, is herein disclosed. The relay apparatus operates not only to open the network switch or breaker whenever there is trouble in any of the high-tension equipment or when the power feeds back into the high-tension feeder, but also automatically recloses the network breaker when conditions are restored to normal and the feeder is in condition to supply power to the network. In general, the means for controlling the connections of the transformers to the network may consist of an electrically-operated carbon circuit breaker controlled by means including an induction-type relay, and is installed in manholes located usually at street intersections, although this invention is not limited necessarily to such installations.

The operating forces in the network relay may be obtained by means of a potential winding, a current winding and a phasing winding. The flux produced by the voltage winding combines with the flux of the phasing winding, or with the flux of the current winding, to produce a torque in the relay. The voltage and phasing windings operate together, when the network breaker is opened, either to close it or to maintain it open, and the torque produced may be, of course, either a closing or an opening torque, depending upon the magnitude and phase position of the phasing voltage with respect to the network voltage. It is desirable, therefore, that the voltage winding be energized at all times in order to secure an electrical torque in the network relay; consequently, the voltage winding is preferably energized from the network.

The phasing-winding circuits of the network relay may be connected across each phase pole or each phase interruption point of the network switch and may be subjected to a wide range of voltages. Since the range of voltages is from approximately one volt, at proper phase conditions, to substantially twice normal network voltage at abnormal conditions, it may be desirable to insert a current limiting means in the phasing circuits for the protection of the phasing windings at the higher voltages.

Since the current winding circuit is also subjected to a wide range of current values the windings are preferably energized from saturable reactive shunts or from saturable current transformers, placed in the secondary conductors of the distribution transformers, in order to limit the current traversing these windings.

When the network is dead or deenergized, the network voltage being zero, the voltage windings of the relay apparatus are in a deenergized condition, and, consequently, there is no torque available in the relays for closing a network breaker in response to a closure of the high-tension feeder-circuit interrupter associated therewith. Therefore, an independent force, which may be a mechanical force such as a spring for biasing the contacts to the closing positions, must be supplied to insure the relay contacts being in a position to cause the closing of the network breaker. Not only must the magnitudes of currents and voltages, on which the relay apparatus must operate, be considered, but, also the phase positions of such currents and voltages must be taken into account to secure satisfactory performance. These will be described in more detail later.

In greater particularity, this invention deals with automatic network-relay apparatus for the control of a network switch or protector by means of a polyphase or plural-element or multi-element network relay or a plurality of such relays which, by means of an anti-pumping device, in the form of a holding magnet, operates to prevent the closing of the associated network switch under certain conditions. When the network switch is closed, the associated plural-element or polyphase network-relay apparatus functions to trip the switch on a reversal of power flow and, when the network switch is open, the relay apparatus acts to close the protector when, and only when, the correct voltage conditions exist across the break contacts of the switch.

This invention utilizes a polyphase relay instead of the single-phase relay heretofore employed. The latter may fail to function correctly under faults of certain types and also may fail to properly close under certain conditions. For example, assuming a three-phase system, one phase of which is lightly loaded and the other phases of which are so heavily loaded as to make it desirable that another network switch be closed to assist in carrying the load, the single-phase network relays associated with the heavily loaded phases may close their contacts, but the relay associated with the lightly loaded phase may not close its contacts and, since the contacts of all three relays are connected in series-circuit relation, the failure of any one relay to close prevents the associated circuit-interrupter, or network switch, from closing when it is desirable that it do so. The use of the polyphase relay apparatus of this invention overcomes this defect and, in addition, provides a more compact mechanical assembly.

It should be noticed that the phasing voltages across the open network breakers, on a system having no feeder-voltage regulators, depend upon the load being carried by the feeders connected to the network. The phasing voltage is the difference between the unloaded transformer voltage, or the station bus voltage, and the network voltage, or it is the voltage drop from the station bus to the point on the network where the potential coils of the relays in question are connected.

Another important feature of this invention is that of the means for preventing pumping of the network breaker under conditions such that the load currents fall within the normal lagging range encountered in network distribution. This is accomplished by means of a holding electromagnet which acts to prevent the closing operation until the phasing voltage, or voltage across the open circuit-interruption points, is of the proper magnitude and phase-angle characteristics. Another anti-pumping arrangement is disclosed in my U. S. Patent No. 1,893,178, issued January 3, 1933 on an application filed June 27, 1925, in which the anti-pumping means is operative upon the opening function rather than upon the closing function, as in this invention wherein the network interrupter may be opened by a leading reverse current caused by a feeder-charging capacity.

Fig. 2 is a diagram illustrating, in detail, a portion of the network system illustrated in Fig. 1 and showing two variations or modifications of the method of utilizing polyphase relays having pump-proof means including a special holding magnet;

Figure 3:
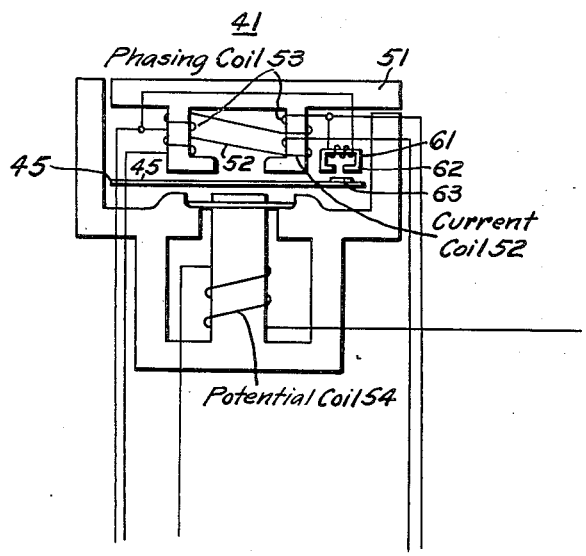
Figure 4:
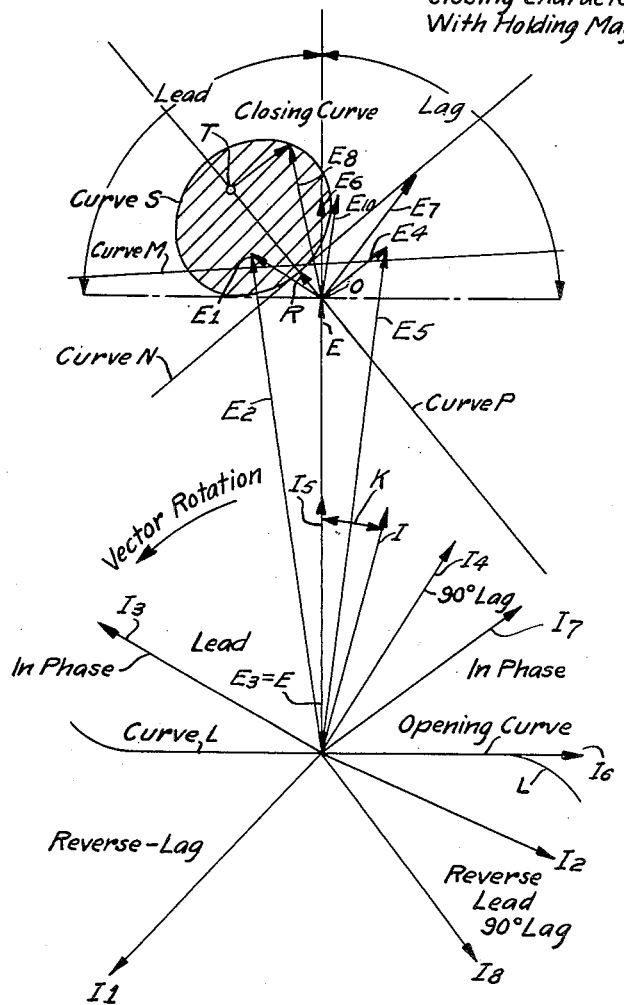

Fig. 3 is a wiring diagram of a portion of a network relay equipped with a holding magnet illustrating the magnetic structure and the location of the various energizing windings; and Fig. 4 is a vector diagram showing the closing characteristics of a network relay having pump-proof means, including a holding magnet energized by the phasing voltage and also showing the opening characteristics of the network relay.

Figure 1:
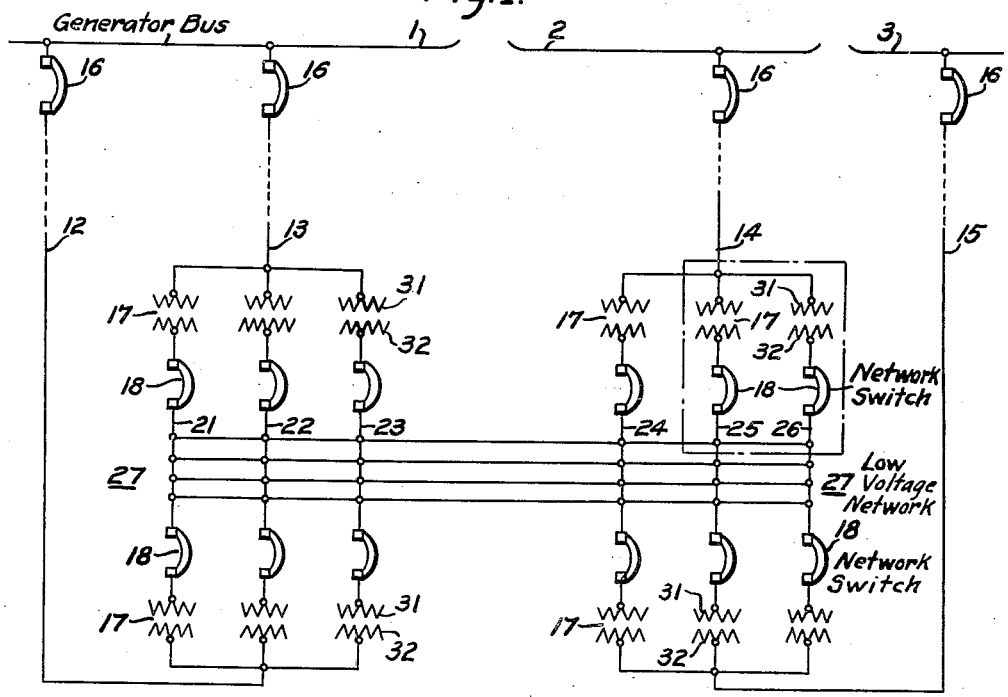
Figure 1 is a line diagram illustrating a network system of alternating-current distribution.

Referring to Fig. 1, the devices 1, 2 and 3 represent generator or sub-station bus bars, or other sources of alternating current, which are utilized to energize a plurality of high-tension feeders 12, 13, 14 and 15 through circuit interrupters 16, as in the usual form of low-voltage network-distribution system.

The feeder circuits 12, 13, 14 and 15 may be connected either to the same source of power or to independent sources of power. If the feeders are connected to independent sources of power, the latter may be synchronized through the network. Thus, the generator source 2 may be synchronized with the independent generator source 3 through the network 27 instead of synchronizing them at the station bus bars.

The feeders 12, 13, 14 and 15 are connected to the high-tension side of the distribution transformers 17, the low-tension sides of which are connected to the network switches 18.

The network switches are connected to the secondary mains or low-voltage supply circuits 21, 22, 23, 24, 25 and 26, which are interconnected to form a secondary low-voltage network 27. The low-voltage network 27 may be termed the work circuit or the load circuit or the interconnected network or the secondary grid or mesh.

The section enclosed by the dotted lines in Fig. 1 and associated with the secondary mains 25 and 26 will be described in detail with reference to Fig. 2 wherein the same reference numerals have corresponding meanings.

In Fig. 2, are illustrated two different modifications of this invention designated as Figs. 2ª and 2ᵇ, both intended to illustrate a system for controlling network switches utilizing means, including a voltage-holding magnet, for preventing "pumping" of the network switches.

Referring to Fig. 2ª, the high-tension feeder 14 is connected to the primary windings 31 of the distribution transformers 17 of the usual step-down type. The primary windings are shown connected in delta relation and the secondary windings 32 are shown connected in star and grounded at the point 33. Obviously, however, other types of connections may be resorted to.

The devices 34 are current or series transformers constructed to saturate at a point approximately 150% to 200% of full load, or at any other point, as may be desired. The purpose of utilizing saturated transformers is to minimize currents passing to the current coils 52 of the relay and to minimize the direct effects upon the relays 41 under conditions of excess current or short-circuit. Also, this expedient permits of a reduction in the size of the magnetic circuits of the transformers, and prevents damage to the transformers in the event of an open secondary circuit.

In order that the relay apparatus 41 may trip on values of reverse currents as small as those caused by the exciting currents of the transformer banks 17, the current transformers 34 are provided with a relatively small number of turns to give sufficient current in the current windings 52 of the relay apparatus at low values of exciting current in the supply lines 25 and 26.

The saturation of the current transformers 34 causes a bend in the opening curve L at the higher values of line current, as shown in Fig. 4, as hereinafter more fully described. The "bends", however, result in better opening characteristics for tripping the relay apparatus 41 under fault conditions and, particularly, for those fault currents the vectors of which terminate within the lower left-hand quadrant, or reverse lagging quadrant, of the vector diagrams. In this connection, it should be noted that the upper left-hand quadrant is the normal leading quadrant, the upper right-hand quadrant is the normal lagging quadrant, the lower left-hand quadrant is the reverse lagging quadrant, and the lower right-hand quadrant is the reverse leading quadrant.

Under almost all fault conditions, the current will fall either in the upper right-hand quadrant or the lower left-hand quadrant, depending upon whether the flow of fault current is in the normal or in the reverse direction. This characteristic may be better understood from the description of operation to be given later.

The secondaries of the current transformers 34 are connected respectively to the corresponding current coils 52 of the relay 41. The primary and secondary windings of the current transformers 34 are connected together at points 35 in order to reduce the number of connections to the relay.

The devices 18 are network switches or circuit interrupters and may be of the usual carbon-circuit-breaker construction having a closing coil 38 and a shunt trip coil 39 energized from the secondary main 26 to be controlled.

Instead of the shunt trip coil 39 for tripping the network switch 18, a low-voltage coil may be used, but the preferred method is generally that illustrated. However, it may be stated that the low-voltage or undervoltage, type may be preferred where frequent system-voltage dips below 15 per cent of normal do not occur, since an undervoltage trip device will always trip on a reverse-power short circuit, regardless of voltage conditions. However, where frequent system-voltage dips are likely to occur which go below 15 per cent of the normal voltage, or even to zero, the shunt trip type is preferable since the switches or protectors 18 will remain closed and thus prevent a network outage. Further, a combination of the shunt trip and undervoltage types may be employed, for example, one-half of each type per feeder.

The closing contacts 48 of the relay 41 are shown connected directly in circuit with the closing coil 38 for the sake of simplicity. In practice, however, a contactor (not shown) may be interposed which closes in response to the closing of the closing contacts 48 and which in turn, energizes the closing coil 38 to close the switch 18. After the switch 18 is closed and latched, an auxiliary or pallet switch (not shown), responsive to the mechanical motion of the switch 18, may open the circuit to the contactor and to the closing coil 38. The switch 18, being latched, remains closed until other conditions require that it open again. These contactor means, auxiliary switch means and latching means are well known in the art and, therefore, are not detailed here.

The relay 41 comprises a plurality of magnetic circuits energized in accordance with electric quantities from a plurality of phases for controlling the network switch 18. In one form, (Fig. 2ª) it is constructed of three independent and similar electromagnetic elements 42, 43 and 44 operating to control two induction discs 45 and 46 mechanically connected to a common shaft 47 which controls the contact members 48 and 49.

The induction discs, or rotating elements, 45 and 46 may be constructed of solid copper in order to secure good torque conditions and a minimum vibration. Good torque conditions are especially desirable during the closing operation when the phasing winding 53 is subjected to a voltage varying from one-half volt to two volts. The copper disc is well adapted to utilize whatever values of flux result from such small phasing voltages.

To secure the proper operation of the relay under sudden changes of voltage and current, a certain amount of damping of the movement of the disc is desirable. This damping may be provided by the usual permanent magnets 50 associated with the disc 46.

In construction, the elements 42, 43 and 44 are substantially identical, but they are independently connected to the three phases A, B and C.

The magnetic structure of each of elements 42, 43 and 44 is as illustrated in Fig. 3, but for the purpose of simplification, the structure is shown in Fig. 2ª in the form of C magnets.

Each of the magnetic circuits 51 of the elements 42, 43 and 44 carries three independent windings; a current winding 52, a phasing winding 53 and a potential or voltage winding 54, arranged as shown in Fig. 3, for controlling the discs 45 and 46, as shown in Fig. 2a.

The current winding 52 of element 42 is connected to the current transformer 34 of phase A. Its purpose is to energize the element 42 in accordance with the magnitude and direction of current flowing in the phase "A" relative to its associated network switch 18.

The phasing winding 53 of element 42 is connected across the breaker contacts, or interruption points, in the phase A of the network switch 18. The purpose of the phasing coil 53 is to energize the element 42 of the relay in accordance with the magnitude and phase position of the voltage across the contacts in the phase A of the network switch 18.

The potential or voltage winding 54 of the element 42 is connected from phase A to the ground on the network side of the switch 18. The purpose of this winding is to energize the relay 41 in such manner as to cooperate with either the current winding 52 or the phasing winding 53 in order to open or close the network switch 18 depending upon the circuit conditions.

The device 55 is a phasing lamp connected in series-circuit relation with phasing winding 53 for the purpose of limiting the current in the circuit in the event of excess voltage, and for automatically increasing the resistance of the circuit when the voltage across the circuit increases. In construction, it may be an ordinary tungsten-filament lamp which has a relatively large positive temperature coefficient of resistance.

The impedance of each phasing circuit, including the phasing winding 53 and the phasing lamp 55, is of such value as to prevent burning out of the phasing lamp 55 under cross-phase closing conditions, and also to prevent any dangerous high voltage from being induced on the primary feeders 14 by the transformers 17 when the associated network interrupter is in open position.

Special attention is directed to the use of the devices 61 which may be called holding magnets. These devices are similar to those described in my U. S. Patent No. 1,893,178, mentioned above. The connections and functions, however, are different.

The holding electromagnets 61 may be mounted at the side of the movement frame just above the discs 45 and 46, respectively. As shown in detail in Fig. 3, each electromagnet 61 comprises a laminated-iron circuit 62 which has an air gap in the lower side; that is, the side just above the discs 45 and 46, respectively. When the closing contacts 48 of the relay are in open position, the air gap is bridged by a small iron vane 63 riveted on the discs 45 and 46. The vane 63 may be prevented from coming into contact with the iron of the electromagnet 61 by a thin brass plate (not shown) riveted to the iron laminations 61. This assists in securing the desired characteristics in the relay 41 and eliminates the effects of any residual magnetism upon its operation.

The relay elements 43 and 44 are of the same construction as that of the element 42 already described but the connections are made to phases "B" and "C", respectively.

The contacts 48 of the network relay are adapted, when closed, to control the closing of the network switch 18 by energization of the closing coil 38 connected in circuit between the phases "A" and "C" on the transformer side of the switch 18.

The contacts 49 of the network relay 41 are connected to the trip coil 39 of the switch 18 and control the opening or tripping of the network switch 18.

When the network 27 is alive or in energized condition and the network switch or protector 18 is in open position, the voltage windings 54 and the phasing windings 53 of the network relay 41 function to close the switch 18 or to prevent it from closing, depending upon the voltage conditions across its main break contacts. When the switch 18 closes, all phasing circuits are short-circuited by the closure of the main contacts of the switch, and the current windings 52 of the network relay 41 are energized. When the network switch 18 is in its closed position, the network relay 41 functions to hold it closed or to trip it, depending upon the direction and magnitude of the load current.

A description of operation will now be given with reference to Figs. 1 and 2a.

Assuming that the complete system is deenergized, or that there is no voltage on the network 27, and that all the primary feeder-circuit interrupters 16 are open and that the busses 1, 2 and 3 are energized; the network switches 18 will be in open position, and all apparatus connected through the feeders 12, 13, 14 and 15 that are influenced from the busses 1, 2 and 3, will be deenergized. Under such conditions, the relay 41 is deenergized and the closing contacts 48 thereof are held in closed position by a spring (not shown) provided for that purpose. That is to say, the contacts 48 are in closed position and ready to perform the closing operation of the network switch 18, under the proper conditions.

Next, assume a closure of the interrupter 16 in the feeder 14. This will energize the transformers 17 associated with the feeder 14 and the secondary windings thereof will then energize the closing coil 38 of the switch 18; the closing coil 38 being energized through the spring-closed contacts 48 of the network relay 41 from the phases "A" and "C", in this particular case.

It may be observed that, as soon as the high-tension switch 16 in the feeder 14 is closed, the associated network interrupter 18 being open, all of the associated phasing windings 53 become energized to some extent provided there is a connected load associated with the network 27. Such load may be connected either to ground, as shown at 81, or between the phases, as shown at 82. This circuit may be traced through the secondary windings 32 of the transformers 17, the phasing windings 53 and the phasing lamps 55, to the network side of the switch 18, through the load 81 to ground and back to the transformer secondary 32. Similar connections may be traced with reference to the load 82 in the network 27. Therefore, the phasing windings 53 of the relay 41 may be energized; but the relay will not be subjected to torque by reason of the fact that the phasing windings 53 alone produce no torque on the relays but must cooperate with the potential windings 54 to produce a torque in the closing direction.

It may be observed also that the potential windings 54 of the network relay 41 may be energized to a slight degree prior to the closing of any switch 18 but the degree of energization is such as to be below the value required to produce a torque sufficient to actuate the relay; the torque which is produced tending to maintain the contacts 48 in their already spring-closed position.

Inasmuch as the closing coil 38 of the switch 18 is now energized, the switch will close and energize the network at the normal secondary voltage. The closing of the switch 18 short-circuits the phasing circuits including the phasing windings 53 and phasing lamp 55.

It may be observed further, in the case assumed that, when the switch 18 is open, the current windings 52 cannot be energized; consequently, the phasing windings 53 and potential windings 54 only may be effective in producing relay torque when the switch 18 is open. However, when the switch 18 is closed, the effectiveness of the phasing windings 53 being eliminated by short-circuiting, the current windings 52 and the potential windings 54 can become effective to produce torque in the relay 41.

Now that the switches 18 associated with the feeder 14 are closed, and current is flowing to the load network 27, the current windings 52 of the network relays 41 are energized in accordance with the magnitude and phase position of the current in the lines A, B and C, respectively. Also, the potential windings 54 of the network relays 41 are energized in accordance with the voltage from phase "A" to ground on the network side of the switch 18. It may be observed that the elements 42, 43 and 44 of the network relay 41, in Fig. 2ª, are energized in accordance with the phases A, B and C, respectively, so that, in general, what is said with reference to one phase or one element applies, respectively, to the other phases and their associated relay elements.

From the foregoing description, it will be understood that a closure of any of the high-tension circuit-interrupters will automatically effect a closure of the associated network interrupters when the network is deenergized.

Assume that it is now desired to energize the network 27 from other power sources also, as, for example, from the generator sources 1 or 3 or both. This involves a synchronizing action through the network switches or interrupters 18, and may be explained more readily by reference to the accompanying vector diagram.

The vectors in Fig. 4 are drawn to show, in general, the operating characteristics of each magnetic element corresponding to each phase of a polyphase system or, assuming balanced three-phase conditions, the characteristics of the complete network relay 41. In every case, the network voltage E, which is the voltage on the network side of the network switch, is used as a reference voltage in plotting all of the vectors and curves.

The vector relationship of the network voltage E and a normal current I flowing to the load 27 is shown in Fig. 4 wherein the vector E represents the network voltage to ground on phase A and, consequently, is the voltage applied to the potential winding 54 of the relay element 42 connected to the phase A.

The vector I represents a normal current flowing in phase A to the network 27 and is shown lagging the network voltage E by an angle K, dependent upon the relative inductance and resistance of the connected load. The current I is the current flowing in the conductor A, a portion of which is translated through the current transformer 34 to the current winding 52 of the network relay 41. Up to the point of saturation of the associated current transformer 34, the current in the winding 52 will be proportional, in magnitude and phase position, to the current I flowing in the conductor A but, as the point of saturation is reached, there will be a deviation in the phase position introduced and also in the magnitude or ratio of current.

Since the potential winding 54 is energized by the network voltage E and, since the current winding 52 is influenced by the phase A current I, the effect of such voltage and current upon the relay will depend upon the phase angle between the voltage E and the current I. If the phase-angle difference is the angle K, the direction of torque upon the relay element 42 will be such as to maintain the relay in closed position.

The relay element 42 is so designed as to have substantially wattmeter-tripping characteristics, as is illustrated by curve L, which may be considered as the loci of the line currents I giving zero torque in the relay element 42. Therefore, any current vector which terminates in the curve L will give a resultant zero torque on element 42. Likewise, any vector, such as the current vector I, which terminates above curve L will maintain the network switch in the closed position.

For practical purposes, the current produced by the voltage E of the voltage winding 54 will lag the voltage E by substantially 90 degrees by reason of the relatively high inductance in the circuit, and the flux produced by such current, being substantially in phase therewith, will lag such voltage by approximately 90 degrees.

The flux produced by the current winding 52 will be substantially in phase with such current. Therefore, when the current in the current winding 52 lags the voltage applied to the voltage winding 54 by an angle of 90 degrees, there will be zero torque operating upon the relay disc 46. The zero torque curve will, therefore, be a line similar to the curve "L" drawn perpendicular to the voltage vector E. Such a curve is herein called an "opening" curve since it is this wattmeter characteristic of the relay 41 that determines the "opening" of the switch 18.

The curve "L" is not exactly at 90 degrees relative to the voltage vector E and also it is not exactly a straight line, except in the case of a true wattmeter characteristic. However, it may be considered as nearly so for practical purposes except that the ends are "bent" by reason of the effect of the saturation transformer 34 upon the translation of current from the line phase "A" to the current winding 52, as previously noted.

If, however, for any reason, the phase position of the current vector I with respect to the network voltage E were to terminate below the curve L, as is illustrated by I₁, for example, the torque on the element 42 would reverse and be in such direction as to cause the tripping contact 49 of the relay 41 to trip or open the switch 18. Such conditions will be considered later.

Referring to Fig. 2ª, assume that the interrupter 16 in the feeder 12 is closed and the network is supplied with energy through the feeder 12 only. Prior to the closure of the interrupter 16 in the feeder 14, the switches 18 associated therewith remain open, although their closing coil circuits 38 are now completed through the contacts 48. This may be explained as follows: As soon as the network 27 becomes energized from the feeder 12, the closing coils 38 of the switches 18 associated with the feeder 14 and in circuit with the phasing coils 53 of the elements 42 (A) and 44 (C) become energized to a relatively small value by reason of the relatively high impedance produced by the phasing coils 53 and the phasing lamps 35 in such circuits. The magnitude of the energization is, however, insufficient to cause a closure.

Further, as soon as the previously mentioned circuits become energized, the contacts 48 open the circuit because the magnitude and phase position of the voltages applied to the phasing windings 53 and the voltage windings 54 of the relay apparatus 41 are such as to produce a torque to open the contacts 48.

Thus far, the network switches associated with the feeder 14 are still in open position. The load, therefore, is fed from the feeder 12 only, and the vectors pertaining thereto are as follows:

Referring to Fig. 4, vector E represents the voltage from phase A to ground. Phase "A" is now being considered exclusively, inasmuch as the same conditions apply independently to the other phases. The phasing windings 53 of element 42 on phase "A" is energized by the voltage $E_3$, which is substantially equal to the voltage minus E ($-E$), and which produces a relatively strong torque in a direction to maintain the closing contacts 48 in an open position. This result is obtained by the cooperative effect of the voltage $E_3$ applied to the phasing winding 53 and the voltage E applied to voltage winding 54. It will be observed that the voltage $E_3$ is shown in the opening portion or the portion below the curve M in Fig. 4. The curve M is the loci of phasing voltages drawn with point O as origin which produce a zero-torque condition in the element 42, corresponding to phase A in the polyphase network relay 41. In the absence of the holding magnet 61, all phasing-voltage vectors having an origin at O and terminating in the portion above the curve M tend to cooperate with the potential winding 54 to produce a closing operation of the network switch 18. At the present instant, the phasing voltage $E_3$ clearly terminates below the curve M. Therefore, the closing contacts 48 will be maintained in an open condition and, consequently, will operate to maintain the switch 18 likewise in an open position.

Now assume that the circuit interrupter 16 (Fig. 1) in the feeder 14 is closed, thereby energizing the transformer 17 associated with the conductor 26. The switch 18 associated with the feeder 14 and the supply circuit 26 is still in open position. There are now two different voltages applied, one to each side of the break contacts of the switch 18, in all of the phases independently. For example, on the network side of the switch 18 in phase A, there exists the voltage E whereas, on the opposite side, which is the transformer side, there exists the unloaded transformer secondary voltage from phase A to ground which is designated in Fig. 4 as the voltage $E_2$. The phasing voltage, which is the voltage across the switch-break contacts, therefore, becomes the resultant of the voltage E and $E_2$ and is represented as voltage $E_1$ in Fig. 4. This voltage $E_1$ terminates above the curve M and, therefore, the voltage $E_1$ applied to the phasing circuit, which includes the phasing winding 53, acting in cooperation with the network voltage E, which is applied to the voltage winding 54, produces a torque on the network relay 41 in a direction to close the contacts 48.

The curve M is, therefore, the loci of the phasing voltages giving a zero torque in the network relay 41, assuming the holding magnet 61 to be absent therefrom.

The curve M is called the "closing" curve because it represents the cooperative effect of the phasing voltage applied to the winding 53 and of the network voltage applied to the voltage winding 54 that controls the closing of the contacts 48 of the network relay 41; and it is these effects that contribute to the "synchronizing" closing characteristic of the network relay 41. The effect of the holding magnet 61 upon the closing characteristics will be shown later to modify the characteristics to curve S.

Where a phasing voltage, such as the phasing voltage $E_1$, terminates above the curve M, the relative voltage-phase positions and magnitudes on both sides of the open switch 18, or across the interruption points thereof, are such that current will flow to the network 27 in the normal direction when the switch 18 is closed. Thus, in the case under consideration, the unloaded transformer voltage $E_2$ bears such relationship to the network voltage E. Therefore, the phasing voltage $E_1$ cooperates with the network voltage E acting through the windings 53 and 54, respectively, to close the contacts 48.

However, systems heretofore employed have had a closing characteristic similar to that illustrated by curve M of Fig. 4, which shows a switch-closing means responsive to a phase position of the phasing voltage $E_1$ terminating in substantially both the right and left upper quadrants when the magnitude of such phasing voltage is of a predetermined value.

This invention adds a new feature to the art by further confining the closing function to a space approximately within the left upper quadrant only; i. e., within the leading phasing-voltage quadrant, approximately. The object is to prevent the closing of the network switch 18 until the phasing voltage $E_1$ terminates within such area. The means utilized to accomplish this result is specifically the so-called holding electromagnet 61 which is connected across the interruption points of the switch 18 and which acts to prevent the network switch 18 from closing until the phase position of the phasing voltage $E_1$ is within such limited closing area. The fundamental object of this system is to prevent "pumping" by preventing closing of the switch 18 until conditions are such that the switch will close and remain closed under normal system conditions and will not immediately reopen again in the absence of a fault or other abnormal condition. The operation of the specific means will be more fully described later.

Referring again to Figs. 2ª and 4, the voltage vector E represents the network voltage, as previously mentioned, applied across the potential circuits of the relay 41 each of which includes a potential coil 54 and a resistor 67. The purpose of the resistor 67 is to rotate the curve of the relay from a position similar to that occupied by curve M (Fig. 4) to the position of curve N. This resistor 67 shifts a component of the network voltage E, which is applied across the potential coil 54, in a leading direction so that the voltage component across the potential coil 54 leads the total network voltage E by a considerable angle and thus may rotate the closing curve of the relay 41 to the position shown as curve N. To explain further, since the phase-angle characteristics in the magnetizable core 51 of the relay 41 are not inherently changed by the utilization of the external resistor or impedance means 67, the position of the closing curve with respect to the voltage across the potential coil 54 is not changed. However, since the voltage component across the potential coil 54 has been rotated in a leading direction with respect to the network voltage E, because of the insertion of resistor 67 in the potential circuit, the closing curve has, at the same time, been rotated in a leading direction with respect to the network voltage E.

The holding magnet 61 is, in broad terms, a means for preventing "pumping" of the switch 18. The anti-pumping problem may be described with reference to Fig. 4. Assume the phasing voltage $E_1$ in another position; namely, $E_4$ which results in the former unloaded transformer voltage $E_2$ being transposed to another position, namely, $E_5$.

First, it will be shown that "pumping" may occur in the absence of some means for confining the phasing-voltage closing area to the leading quadrant of the Fig. 4. The current which flows upon closing the switch 18, bears a certain relationship to the phasing voltage which existed across the switch 18 immediately prior to its closing. This current may lie somewhere between a position in phase with the phasing voltage and 90° lagging the phasing voltage, depending upon the resistance and inductance of the circuit.

Referring to Fig. 4, for example, the phasing voltage $E_1$, which existed immediately prior to the closing of the switch 18, causes a current to flow which may lie between the in-phase position; namely, $I_3$, and a 90° lagging position; namely, $I_4$ depending upon the resistance and inductance of the circuit.

Assuming a phasing voltage $E_6$ in phase with the network voltage E, this phasing voltage $E_6$ may result in a current vector anywhere between the in-phase position, such as the current $I_5$, and 90° lagging, such as $I_6$. Obviously, the limits of the termini of these current vectors lying between $I_5$ and $I_6$ lie above the curve L and, therefore, any phasing voltage, such as the voltage $E_6$ in phase with the network voltage E, or any voltage leading the in-phase voltage $E_6$, such as the voltage $E_1$, which will cause the switch 18 to close, will produce a current I when the switch 18 closes, which terminates above the curve L and will, therefore, maintain switch 18 in the closed position. In such case, there can be no "pumping".

However, in the case of a voltage lagging the in-phase phasing voltage $E_6$, such as the voltage $E_4$, a condition may arise which will cause "pumping", in the absence of the holding or phasing magnet 61. As, for example, since the phasing voltage $E_4$ terminates above the curve M, the closing contacts 48 of the relay 41 will be caused to close and thus the switch 18 will close. A current $I_2$ will then flow which will lie somewhere between $I_7$, in phase with the phasing voltage $E_4$, and $I_8$ lagging the phasing voltage $E_4$ by 90°. It will be seen that, if the resistance and the reactance of the circuit be such that the current $I_2$ lags the phasing voltage $E_4$ appreciably, it will terminate below the curve L and cause the network switch 18 to immediately open, and, since the phasing voltage $E_4$ which causes switch 18 to close, produces a current $I_2$, for example, which will cause the switch 18 to immediately reopen, an unstable, or pumping condition, therefore exists.

The conditions for preventing pumping of the network interrupter have been outlined. It is not proposed to consider the pump-proof means which may be utilized to accomplish that result.

As previously explained, the closing curve M may be rotated by means of the resistors 67 to the position of curve N, and the curve N may be changed to the position of curve S by means of the holding magnets 61. In other words, the addition of the holding magnets 61 and resistors 67 changes the closing characteristics of relay 41 from those shown by curve M to those shown by the closed curve S. Any phasing voltage which terminates within the shaded area enclosed by the curve S, such as the phasing voltage $E_1$ tends to produce a torque to close the contacts 48 of the relay 41. Any phasing voltage which terminates outside of the area enclosed by the curve S, such as $E_4$, tends to produce a torque to maintain contacts 48 in open position. It may be seen, by referring to Fig. 4, that any phasing voltage which lags the network voltage E by more than a few degrees, such as the phasing voltage $E_{10}$, will not, when acting in conjunction with the network voltage E, produce a torque to close the contacts 48 of the relay 41 and, since the contacts 48 will not close on a lagging phasing voltage, the network switch 18 cannot close, and "pumping" cannot occur.

It is now proposed to explain how the holding magnets 61 act to produce the closing curve S which provides the anti-pumping feature. The line OR in Fig. 4 represents a torque tending to maintain the contacts 48 in the open position. This torque is the difference between a bias torque, tending to open the contacts 48, which is produced by lagging a part of the flux produced by the potential coils 54, and the torque produced by the control spring (not shown) tending to close the contacts 48. Since the network voltage E is approximately constant and, since the bias opening torque is approximately proportional to the square of the network voltage E, the difference between this bias torque and the spring torque tending to close the contacts 48, which is represented by the line OR, is a constant.

Since, in the absence of the holding magnets 61, curve N is the loci of phasing voltages drawn from the origin O which produce a zero-torque condition in the relay 41, the torque produced by any phasing voltage, such as $E_7$, terminating on the curve N will produce a torque which may be represented by the line OR and which is in the opposite direction to the torque OR resulting from the bias torque and the relay spring torque. The torque produced by any phasing voltage is, therefore, approximately proportional to the product of that phasing voltage and the cosine of the angle between it and the line P which is drawn perpendicular to the curve N. So long as the opening torque OR which must be overcome by any phasing voltage, such as $E_7$, in order to produce a zero-torque condition in the relay 41, remains constant, the loci of all such phasing voltages which produces a closing torque proportional to the line OR will fall along the curve N. Since the holding magnets 61 are connected in parallel with the phasing coils 53, they produce a torque tending to maintain the contacts 48 of the relay 41 in open position, which torque is approximately proportional to the square of any phasing voltage, such as $E_7$. When the phasing voltage is such as $E_7$, an opening torque, approximately proportional to the square of the voltage $E_7$ and represented by the line RT, must now be overcome in addition to the constant opening torque OR in order to produce a zero condition in the relay 41. A positive closing torque equal to the opening torque represented by line OT must, therefore, be produced by the phasing voltage $E_7$ in order to obtain a zero-torque condition in the relay 41. In order to produce a torque proportional to OT, the phasing voltage $E_7$ must be rotated in the leading direction to the position $E_8$ so that its projection on the line P is equal to OT. The terminus of the phasing voltage $E_8$ gives a point on the new closing curve which is obtained by means of the holding magnets 61. In a similar manner, all other phasing voltages which give a zero-torque condition may be determined, both as to magnitude and as to phase position, and will be found to terminate on the closed curve S.

The holding magnets 61 are, therefore, means for preventing pumping under all conditions and they accomplish this result by preventing the closure of the relay 41 unless the phasing voltage has the proper phase position relative to the network voltage.

Assuming that the network 27 is energized by two or more feeders, as, for example, by the feeders 12, 13, 14, 15 in Fig. 1, if a fault occurs in connection with the network 27, such as the phase-to-phase fault 71, or the phase-to-ground fault 72, the current will continue to flow into the conductors A, B and C in the normal direction, which is from the transformers 17 to the network 27. Consequently, the relays 41 controlling the switches 18 will be unaffected and will be maintained in closed position. It is the usual practice to permit such faults 71 and 72 in the network to clear themselves by "burning clear".

Should a fault, such as the fault 73, occur relative to the high-voltage feeder 14, the switch 18 will automatically open and interrupt the circuit, and, similarly, all other network switches 18 associated with the same feeder 14 will open their respective circuits and thus completely disconnect the faulty feeder 14 from the network.

A fault, such as the fault 74 relative to the transformer 17, will produce a like result.

When a fault, such as the fault 73 or the fault 74, occurs, a current will feed to such faults from the network 27 through the conductors A, B and C and the transformer 17, to the fault, thus reversing the normal direction of current flowing in the lines 26 and producing a current which may be represented by the vector $I_1$, as shown in Fig. 4.

Inasmuch as the line current vector $I_1$ terminates below the opening curve L in Fig. 4, a torque will be produced in the relay 41 in such direction as to close the contacts 49 and thus trip or open the associated switch 18.

Similarly, since the current is flowing in all other lines associated with the feeder 14 in a direction from the network to the fault 73, all of the switches 18, associated with feeder 14 only, will likewise open.

This completely disconnects the feeder 14 from the network so that no current can now be fed from the network to the fault. However, current will be fed to the fault 73 or the fault 74 from the bus 2 through the circuit interrupter 16 in the feeder 14. The excess current thus flowing may be interrupted by the usual excess-current relay by tripping the interrupter 16 by the usual excess-current relay or by similar means.

Now, assume that the interrupter 16 is closed, that the network switches 18 associated with the lines 24, 25 and 26 are closed, that current is normally being fed to the network 27 from the bus 2 over the feeder 14 and that current is also being fed to the network 27 over the other feeders.

Further, assume that the station circuit interrupter 16 associated with the feeder 14 is opened by the station operator, then the network switches 18 associated with the feeder 14 will also open in the following manner.

Since the primaries 31 of the transformers 17 are now deenergized, the transformer 17 will be magnetized from the secondary 32 which means that a small amount of magnetizing current will flow from the network 27 to the secondary 32 in a direction that is the reverse of the normal direction. Since these currents flow in an abnormal or reverse direction, they will cause the network switch 18 to open in the same manner as was described in the case of the fault 73 or the fault 74. Although the values of current will be relatively small, the relay has been designed to have such sensitivity that it will operate on such relatively small values of current flowing in the reverse direction.

Referring to Fig. $2^b$, the apparatus utilized is similar to that described in connection with the preferred scheme shown in Fig. $2^a$, with the following exceptions:

Two polyphase network relays 111 and 112 are provided in place of the single network relay 41 previously described. In effect, the opening and closing functions combined in the relay 41 have been separated into two relays 111 and 112 in this alternative scheme.

The polyphase relay 111 is the opening relay and carries the current winding 52 and the potential or voltage windings 54. The polyphase relay 112 is the closing relay and carries the phasing windings 53 and the potential windings 54. All of the windings mentioned have the same significance and reference numbers as were used in the description in Fig. $2^a$. The mechanical construction is also identical except that, in Fig. $2^b$, there are provided separate contact members 48 and 49, holding magnets 61 are applied to one relay only, and the relay apparatus has been separated into two polyphase relays 111 and 112 instead of being combined in one relay 41 previously described.

The construction of the holding magnets 61 may be the same as that described hereinbefore but, in this instance, the coil or winding thereof is connected in the phasing circuit; namely, in parallel with the phasing winding 53 and operates to modify the closing curve by producing a torque which tends to hold the contacts 48 open. It may be observed that, in copending application, Serial No. 39,947, the holding magnet 15 is connected to the current circuit and operates on the opening curve rather than on the closing curve, as in this application although both schemes constitute so-called anti-pumping means.

The description of the operation of the alternative scheme shown in Fig. $2^b$ is substantially the same as that already given in connection with Fig. $2^a$, with the following exceptions:

The opening and closing functions have been separated into two separate polyphase relays 111 and 112, which produce, independently, the opening and closing functions already discussed in connection with Fig. $2^a$. The description may be correspondingly transferred to Fig. $2^b$, including that covering the means for preventing "pumping" of the switch 18 comprising the holding magnets 61.

Various modifications may be made in my invention without departing from the spirit and scope thereof and I desire, therefore, that only such limitations shall be placed thereon as are disclosed by the prior art and set forth in the appended claims.

I claim as my invention:

1. The combination with an alternating-current-load circuit and a supply circuit therefor, of a circuit-interrupter between the two circuits, and interrupter-controlling means including means for closing the interrupter in response to a predetermined relationship of voltages derived from said circuits, means for opening the interrupter upon the occurrence of energy reversal or energy transmission from the load circuit to the supply circuit, and means including a holding electromagnet connected to the closing means only, for preventing pumping of the interrupter when the impedance phase angle of load currents traversing said interrupter is within a predetermined normal lagging range of values.

2. An alternating-current distribution system including a plurality of feeders, a transformer in each feeder, a work circuit connected to said transformers, a circuit interrupter between each transformer and said work circuit, and circuit-interrupter controlling means, including a voltage responsive holding magnet connected to the work circuit side and to the transformer side of the interrupter, for preventing pumping of the interrupter under predetermined normal impedance conditions of said load circuit.

3. An alternating-current control means for a circuit interrupter including a directional means for opening the interrupter, synchronizing means for closing the interrupter, and a holding magnet associated with the closing means only for preventing pumping of the interrupter when the impedance phase angle of load currents traversing said interrupter is within a predetermined normal lagging range of values.

4. Control apparatus for a plurality of feeders and a network in a system of alternating-current distribution including a transformer in each feeder for supplying energy to the network, a switch connected between each transformer and the network, and switch-control means including a single relay acting on a common movable member and means, including a holding magnet responsive to voltage across the switch-break contacts, for preventing pumping of the switch under predetermined normal impedance conditions of said network.

5. In a polyphase alternating-current system of distribution, a working circuit, a plurality of polyphase feeder circuits for feeding energy to said working circuit, a transformer in each feeder circuit, a switch in the secondary circuit of each transformer, and switch-controlling means in the secondary circuit of each transformer operable to cause the switch to open in response to a fault on the corresponding feeder circuit and to reclose in response to a predetermined relationship of voltage conditions derived from the feeder and network sides of the switch, said switch-controlling means including a movable member operable to a closing position, electromagnetic means energized from a plurality of phases for exerting a closing force on said member and a holding magnet for exerting a restraining force on said member opposing operation thereof to said closing position.

6. An alternating-current distribution system including a plurality of feeders, a transformer in each feeder, a load circuit connected to said transformers, a switch between each transformer and its source of power, a circuit-interrupter between each transformer and said load circuit, and interrupter-control means including means for closing the circuit interrupter in response to a predetermined relationship of voltages derived from the feeder and load sides of said interrupter, said means including a voltage-responsive holding electromagnet for allowing the interrupter to close through approximately a 90 degree range of phasing voltages and means responsive to abnormal direction of current through the interrupter for opening the interrupter.

7. An alternating-current distribution system including a plurality of feeders, a transformer in each feeder, a load circuit supplied from said transformers, a switch between each transformer and its source of power, a circuit-interrupter for controlling the power flow between each transformer and said load circuit, conductors connecting each transformer to the load circuit in series with the corresponding switch and interrupter-control means, including a single relay, for closing the circuit-interrupter in response to a predetermined relationship of voltages derived from the feeder and load sides of said circuit interrupter, said interrupter-control means including an electromagnet for allowing the interrupter to close only when the phasing voltage across the interrupter is within a range of phase-angle positions between a limiting position within approximately 10° of the in-phase position of a reference line voltage derived from the corresponding conductors and a limiting position leading said reference voltage by a phase angle of the order 80° to 100°.

8. The combination with a circuit, of a circuit-interrupter and interrupter-control means including means for closing the circuit-interrupter in response to a predetermined relationship of voltages derived from the source and load sides of said interrupter, said means including a holding electromagnet for allowing the interrupter to close only when the voltage on the supply side of the interrupter is substantially equal to, or greater than, the voltage on the load side of the interrupter and only when said voltage on the supply side of the interrupter leads, or is substantially in phase with, the voltage on the load side of the interrupter, and opening means responsive to direction of the current flow.

9. An alternating-current distribution system including a plurality of feeders, a transformer in each feeder, a load circuit connected to said transformers, a switch between each transformer and its source of power, a circuit-interrupter between each transformer and said load circuit, and interrupter-control means, including a single relay, for closing the circuit-interrupter in response to a predetermined relationship of voltages derived from the feeder and load sides of said interrupter, said means including an electromagnet for allowing the interrupter to close only when the voltage on the supply side of the interrupter is substantially equal to, or greater than, the voltage on the load side of the interrupter and only when said voltage on the supply side of the interrupter leads, or is substantially in phase with, the voltage on the load side of the interrupter, and opening means responsive to the phase position of the current flowing through the interrupter as compared to a line voltage condition.

10. The combination with a circuit, of a circuit-interrupter and interrupter-control means for effecting the opening and closing of said interrupter, said control means including a relay having a movable member operable to an interrupter-opening position and to an interrupter-closing position, electromagnetic means for effecting movement of said member to said interrupter-opening position in response to predetermined current and voltage conditions of said circuit, and means effective when said interrupter is open for modifying the operation of said electromagnetic means to effect movement of said member to said interrupter-closing position only when the phasing voltage across the interrupter is within a range of phase-angle positions between a limiting position within approximately 10° of the in-phase position of a line voltage condition of said circuit and a limiting position leading said line voltage condition by a phase-angle of the order of 80° to 100°.

11. The combination with a circuit, of a circuit interrupter and interrupter-control means, including means comprising a single relay having an electromagnet, for closing the circuit-interrupter dependent upon the magnitude and phase position of the voltage across the interrupter when it is open and for opening said interrupter depending upon the magnitude and phase position of the current flowing through it when it is closed, said means allowing the interrupter to close only when the voltage across the open interrupter falls within approximately a 90 degree phasing range and allowing the interrupter to open when the current through the interrupter is reversed and falls within approximately a 180 degree range, and having an angle between its opening and closing curves on the lead side of the network voltage less than the angle between the voltage across the open interrupter and the current which will flow through the interrupter after it closes and having an angle between the opening and closing curves on the lag side of the network voltage greater than the angle between the voltage across the open interrupter and the current which will flow through it after it closes.

12. An alternating-current distribution system including a plurality of feeders, a transformer in each feeder, a load circuit connected to said transformers, a switch between each transformer and its source of power, a circuit interrupter between each transformer and said load circuit, and interrupter-control means, including means comprising a single relay having a voltage-responsive holding magnet, for closing the circuit interrupter dependent upon the magnitude and phase position of the voltage across the interrupter when it is open and for opening said interrupter depending upon the magnitude and phase position of the current flowing through it when it is closed, said means allowing the interrupter to close only when the voltage across the open interrupter falls within approximately a 90 degree phasing range and allowing the interrupter to open when the current through the interrupter is reversed and falls within approximately a 180 degree range and having an angle between its opening and closing curves on the lead side of the network voltage less than the angle between the voltage across the open interrupter and the current which will flow through the interrupter after it closes and having an angle between its opening and closing curves on the lag side of the network voltage greater than the angle between the voltage across the open interrupter and the current which will flow through it after it closes.

13. An alternating-current distribution system including a plurality of feeders, a transformer in each feeder, a load circuit connected to said transformers, a switch between each transformer and its source of power, a circuit-interrupter between each transformer and said load circuit, and interrupter-control means, including a relay for effecting an interrupter-closing operation, said relay having electromagnetic means for effecting said interrupter-closing operation only in response to predetermined voltage conditions including the condition that the voltage on the source side of said circuit-interrupter is not less than the voltage on the load side thereof, said electromagnetic means being effective to prevent said interrupter-closing operation at all times when the voltage on the source side of said circuit-interrupter lags the voltage on the load side thereof by an angle greater than substantially 10°.

14. An alternating-current distribution system including a plurality of feeders, a transformer in each feeder, a load circuit connected to said transformers, a switch between each transformer and its source of power, a circuit-interrupter between each transformer and said load circuit, and interrupter-control means including means for closing the circuit-interrupter only when the voltage across said interrupter is within a predetermined limit of absolute magnitude and will cause a current to flow after the interrupter closes which will maintain it closed, said closing means including means allowing the interrupter to close only when the voltage on the supply side of the interrupter is substantially equal to, or greater than, the voltage on the load side of the interrupter and only when said voltage on the supply side of the interrupter leads, or is substantially in phase with, the voltage on the load side of the interrupter, and opening means responsive to the phase position of interrupter current.

15. The combination with a circuit, of a circuit-interrupter and interrupter-control means including means for closing the circuit-interrupter only when the voltage across the open interrupter is within a predetermined limit of absolute magnitude and leads the voltage on the load side of the interrupter from approximately 0 to approximately 90 degrees and means for tripping said interrupter on any appreciable load-current reversal which either leads or lags the voltage on the load side on the interrupter.

16. An alternating-current distribution system including a plurality of feeders, a transformer in each feeder, a load circuit connected to said transformers, a switch between each transformer and its source of power, a circuit-interrupter between each transformer and said load circuit, and interrupter-control means including means for closing the circuit interrupter only when the voltage across the open interrupter is within a predetermined limit of absolute magnitude and leads the voltage on the load side of the interrupter from approximately 0 to approximately 90 degrees and means for tripping said interrupter on any appreciable load-current reversal which either leads or lags the voltage on the load side of the interrupter.

17. The combination with a circuit, of a circuit interrupter and interrupter-control means including means for closing the circuit-interrupter dependent upon the magnitude and phase position of the voltage across the interrupter when it is open and means for opening said interrupter depending upon the magnitude and phase position of the current flowing through it when it is closed, said closing and opening means allowing the interrupter to close only when the voltage across the open interrupter is within a predetermined limit of absolute magnitude and falls within approximately a 90 degree range and allowing the interrupter to open when the current through the interrupter is reversed and falls within approximately a 180 degree range, and having an angle between its opening and closing curves on the lead side of the network voltage less than the angle between the voltage across the open interrupter and the current which will flow through the interrupter after it closes and having an angle between the opening and closing curves on the lag side of the net work voltage greater than the angle between the voltage across the open interrupter and the current which will flow through it after it closes.

18. An alternating-current distribution system including a plurality of feeders, a transformer in each feeder, a load circuit connected to said transformers, a switch between each transformer and its source of power, a circuit interrupter between each transformer and said load circuit, and interrupter-control means including means for closing the circuit interrupter dependent upon the magnitude and phase position of the voltage across the interrupter when it is open and means for opening said interrupter depending upon the magnitude and phase position of the current flowing through it when it is closed, said closing and opening means allowing the interrupter to close only when the voltage across the open interrupter is within a predetermined limit of absolute magnitude and falls within approximately a 90 degree range and allowing the interrupter to open when the current through the interrupter is reversed and falls within approximately a 180 degree range and having an angle between its opening and closing curves on the lead side of the network voltage less than the angle between the voltage across the open interrupter and the current which will flow through the interrupter after it closes and having an angle between its opening and closing curves on the lag side of the network voltage greater than the angle between the voltage across the open interrupter and the current which will flow through it after it closses.

19. The combination with a circuit, of a circuit interrupter and interrupter-control means including means for closing the circuit interrupter dependent upon the magnitude and phase position of the voltage across the open interrupter and operable only when said voltage is within a predetermined limit of absolute magnitude and does not lag the voltages on the load side of the interrupter appreciably and means for tripping the interrupter on any leading or lagging reverse currents of appreciable magnitude.

JOHN S. PARSONS.